United States Patent [19]

Ritchie et al.

[11] Patent Number: 5,000,997

[45] Date of Patent: Mar. 19, 1991

[54] METHOD FOR MAKING A PAINTED PART AND PART MADE THEREBY

[75] Inventors: Jack J. Ritchie, Washington; Daniel G. Bernardi, Mt. Clemens; Jerry E. Purcell, Farmington Hills, all of Mich.

[73] Assignee: The Budd Company, Troy, Mich.

[21] Appl. No.: 306,990

[22] Filed: Feb. 6, 1989

[51] Int. Cl.[5] .................. B32B 3/14

[52] U.S. Cl. .................. 428/78; 156/280; 156/312; 156/319; 180/69.2; 296/191; 427/209

[58] Field of Search .................. 156/280, 319, 312; 427/209; 296/191; 180/69.2; 428/78

[56] References Cited

U.S. PATENT DOCUMENTS 1,333,214 3/1920 O'Byrne .................. 180/69.2
4,383,060 5/1983 Dearlove et al. .
4,488,862 12/1984 Epel et al. .
4,515,543 5/1985 Hamner .
4,551,085 11/1985 Epel et al. .
4,612,149 9/1986 Iseler et al. .

FOREIGN PATENT DOCUMENTS 61-249877 11/1986 Japan .................. 180/69.2

OTHER PUBLICATIONS

European Search Report dated 5/22/90, Application No. 90101502.4 (3 pp).

*Primary Examiner*—John J. Gallagher
*Attorney, Agent, or Firm*—Harness, Dickey & Pierce

[57] ABSTRACT

Surface imperfections on painted fiber reinforced plastic (FRP) automotive body panels are substantially eliminated by incorporating thermally conductive material into the part that serves to minimize temperature differentials on the surface of the part to be painted.

11 Claims, 2 Drawing Sheets

METHOD FOR MAKING A PAINTED PART AND PART MADE THEREBY

BACKGROUND OF THE INVENTION

1. Technical Field

This invention relates to painted parts and, more particularly, to painted plastic body panels for use in the automotive industry.

2. Discussion

There has been an increasing use of fiber reinforced plastic (FRP) exterior body panels in the automotive industry. The FRP parts are generally characterized as being more lightweight and corrosion resistant than their metal counterparts. However, one of the problems preventing even more widespread use of FRP exterior automotive body panels is the difficulty in obtaining good painted surface quality that matches or exceeds that of traditional stamped metal panels. One of these problems is known in the trade as "show through" which is a distortion or blemish seen when viewing the painted exterior surface of the finished part.

SUMMARY OF THE INVENTION

It has been discovered that the aforementioned show through problem can result because of uneven temperatures on the exterior surface of the part during the painting process. Pursuant to the broad teachings of this invention, a thermally conductive material is applied in heat transfer relationship to the external surface of the part, yet it is spaced from the external surface so as to not degrade its smooth appearance. The thermally conductive material serves to evenly distribute heat throughout the exterior surface of the part during the painting processes to thereby provide a smooth, aesthetically pleasing surface quality for the part.

The thin thermally conductive sheet is preferably of a metallic material that can additionally serve as a radio frequency (RFI) or electromagnetic interference (EMI) shield when the part is otherwise made of a nonmetallic material such as FRP.

BRIEF DESCRIPTION OF THE DRAWINGS

The various advantages of the present invention will become apparent to those skilled in the art after reading the following specification and by reference to the drawings in which.

DESCRIPTION OF THE PREFERRED EMBODIMENT

Figure 1:
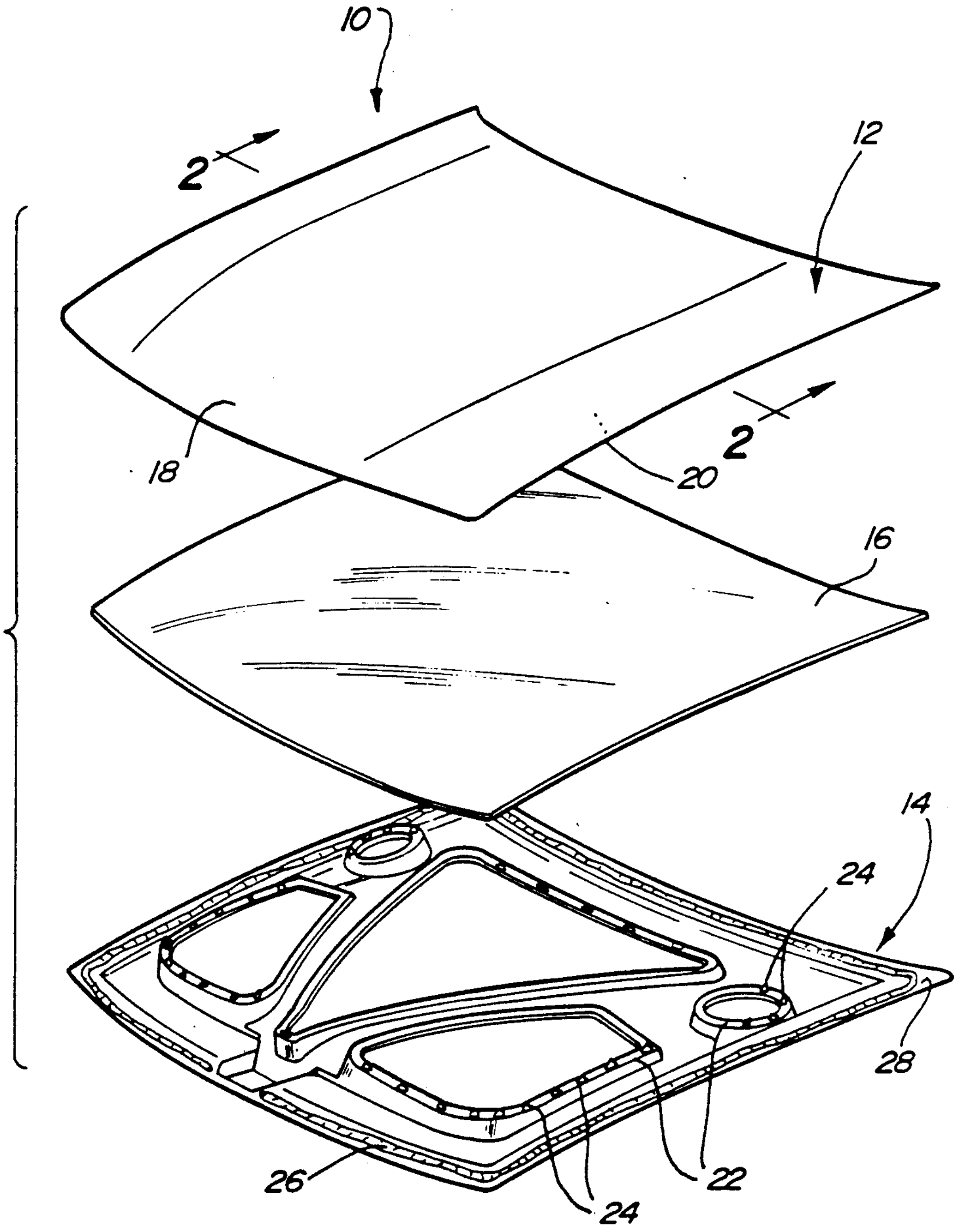
FIG. 1 is an exploded perspective view of a part made in accordance with the teachings of the present invention.

It should be understood at the outset that while this invention will be described in connection with making an exterior automotive body panel, the broad teachings of this invention have much wider applicability. With that caveat in mind, the present invention will be described in connection with making a Ford Taurus SHO hood for the 1990 model year. The hood 10 includes a fiber reinforced plastic outer skin 12 and an inner reinforcement member 14 also made of FRP. The outer skin 12 is preferably made from sheet molding compound (SMC) using compression molding techniques under vacuum. Such techniques are disclosed in more detail in the following commonly assigned U.S. patents which are hereby incorporated by reference: U.S. Pat. No. 4,488,862, issued Dec. 18, 1984; U.S. Pat. No. 4,612,149, issued Sept. 16, 1986; and U.S. Pat. No. 4,551,085, issued Nov. 5, 1985. However, it should be understood that the skin 12 can be made from a variety of materials and processes.

It is believed that the present invention has applicability to parts made of a variety of materials, even metal, where problems are encountered due to temperature differentials at various locations on the part surface to be painted. These temperature differentials can be created by a variety of reasons. In this specific example, it has been discovered that temperature differentials are created between those areas of skin 12 that are supported and unsupported by the reinforcement member 14. Where the reinforcement member 14 is attached or in close proximity to the outer skin, there is created a localized area of increased mass relative to the unsupported thickness of the skin standing alone. It is believed that the supported areas act as heat sinks which cause them to be at different temperatures than the unsupported areas which consist simply of a single thickness of the skin 12.

In this particular embodiment, the reinforcement member 14 is also made of fiber reinforced plastic which can be made from similar materials and processes as the skin 12. Member 14 includes a plurality of hat-shaped cross sections distributed throughout its structure to provide reinforcement as necessary for the relatively thin outer skin 12. The shape and material of the reinforcement member can, of course, be varied depending upon the configuration of the final part.

In accordance with the teachings of the present invention, a thin, thermally conductive sheet 16 is applied to the skin 12 (in this embodiment to the interior surface 20 so that the sheet 16 is in thermal transfer relationship to the exterior surface 18 of the outer skin 12 yet it is spaced therefrom so as to not degrade its smooth surface qualities. As will appear, one of the purposes of the sheet 16 is to equalize the temperature on the outer surface 18 during the painting process. The thermally conductive sheet in the preferred embodiment is an aluminum foil approximately 1–3 mils thick. Aluminum foil is presently preferred because it is relatively inexpensive, lightweight and possesses good thermal conductivity. Preferably, the sheet 16 should be made of a metallic material. If metallic materials are used, then the part will have the extra benefit of being an RFI/EMI shield. This is a very advantageous feature for plastic hoods or other engine covering panels where it is necessary to provide shielding from radio frequency noise created in the engine compartment.

It is also envisioned that the sheet 16 can be replaced by a layer or coating of metallic material (such as copper, brass or aluminum) that has been painted or sprayed onto the interior surface 20 of the skin 12. At the present time, it appears that the use of a continuous sheet or coating is preferable over a discontinuous or random layer.

Figure 2:
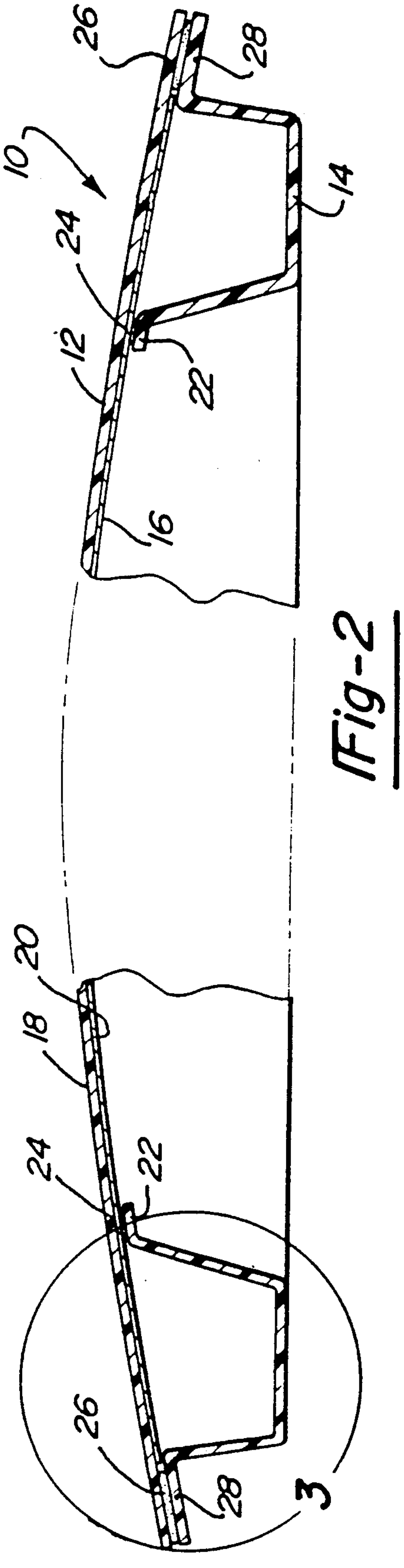
FIG. 2 is a cross sectional view of the assembled part of FIG. 1.

In this specific embodiment, the aluminum foil sheet covers substantially the entire interior surface 20 of skin 12 except for the margins thereof. The sheet 16 is spaced from the edges of the skin by a sufficient distance (in this example, about 25 mm) to permit structural adhesive to mate directly between the outer marginal areas of the reinforcement member 14 and skin 12. One convenient way of positioning the sheet 16 is to spread it out and attach it to the inboard flanges 22 of reinforcement member 14 with a suitable adhesive. The adhesive shown in FIG. 1 and 2 is a series of spaced blobs 24 of nonstructural adhesive. Although a variety of adhesives can be used, a commonly employed soft tacky adhesive known in the trade as dum-dum (such as SLUG CAULK) is presently preferred.

Figure 3:
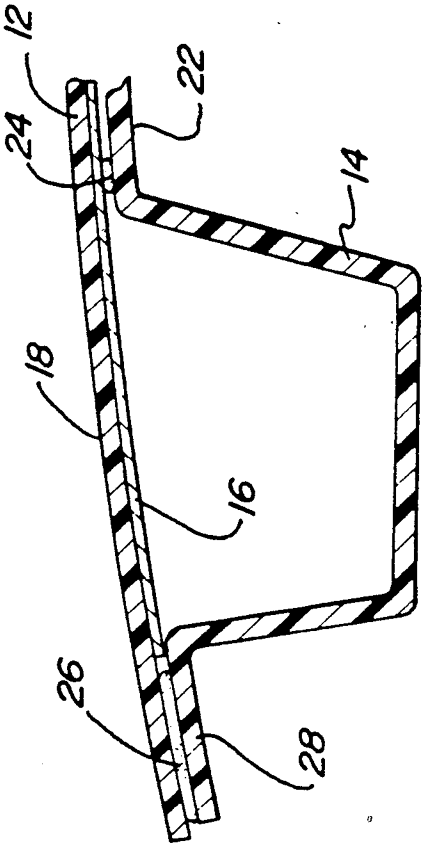
FIG. 3 is an enlarged partial cross-sectional view of an end portion of the part.

Part 10 is assembled as shown in FIG. 2. A bead 26 of structural adhesive is laid about the outboard marginal flange 28 of the reinforcement member 14 and the outer skin brought into contact with the reinforcement member/sheet subassembly as illustrated in FIG. 2. The adhesive 26 is preferably a thermosetting adhesive such as an epoxy based adhesive. It is cured by localized heating in a conventional manner. Thus, as may be clearly seen from FIGS. 2 and 3, in the assembled skin 12 the sheet 16 is sandwiched between reinforcement member 14 and the interior surface 20 of part 10 when the two components are bonded together.

The hood assembly 10 is now ready for painting in the traditional manner. This generally entails applying one or more primer coats, each coat being followed by a heating or baking step to dry the primer. Then, the top paint coats are applied. The top paint coats can be applied in a variety of well known manners such as spraying. It is a feature of this invention that the part can be painted with metallic paints which have heretofore created difficulties for FRP body panels. The metallic particles in these paints tend to be very susceptible to temperature differentials on the surface of the part to be painted. However, the present invention evenly distributes the temperature over the exterior surface 18 of skin 12 so that these problems are not created by hot spots which can otherwise be generated by the nonuniform cross sectional mass of the part 10. The even temperature distribution is maintained during initial application of the primer and top coat paint, as well as in subsequent baking thereof. As is known in the art, the application of the top coat paint is generally followed by a baking step in a conventional gas-fired convection oven. Oven temperatures are generally in the range of 300–400 degrees Fahrenheit. When the painted part is heated the foil sheet 16 is a better thermal conductor than even the concentrated masses provided by the hat-shaped sections of reinforcement member 14. As a result, substantially even temperature distribution results.

As noted at the outset, the present invention can be used in a wide variety of applications where it is desired to provide relatively large (in excess of one square foot) surfaces with extremely smooth, blemish-free painted surfaces without the aforementioned show through problem. It does, however, find particular utility for plastic exterior automotive body panels and, especially for cover panels for engine compartments where RFI/EMI shielding is required. Those skilled in the art will come to appreciate that other modifications can readily be made without departing from the spirit and scope of this invention after having the benefit of studying the foregoing specification, drawings and following claims.

We claim:

1. A method of making a reinforced painted plastic part comprising:
   providing a relatively large plastic part with interior and exterior surfaces;
   providing a reinforcement member;
   applying a thermally conductive material so that it is sandwiched between the interior surface of the plastic part and the reinforcement member;
   bonding the reinforcement member to the interior surface;
   applying paint to the part;
   heating the part to dry the applied paint; and
   using the thermally conductive material to evenly distribute the heat to avoid paint blemishes in the area of the reinforcement member thereby providing an aesthetically pleasing painted surface for the part.

2. The method of claim 1 wherein said thermally conductive material is in the form of a metallic foil applied to the interior surface.

3. The method of claim 1 wherein the reinforcement member is essentially nonmetallic.

4. The method of claim 1 wherein the part is heated in a convection oven to a temperature above 300° Fahrenheit.

5. The method of claim 1 wherein the paint is a metallic paint.

6. A method of making a reinforced painted part, said method comprising:
   (a) providing a nonmetallic outer skin with exterior and interior surfaces;
   (b) providing a nonmetallic reinforcement member having a plurality of hat-shaped cross sections with inboard and outboard flanges;
   (c) positioning a substantially continuous metallic sheet between the skin and reinforcement member, said sheet being substantially coextensive with the interior surface of the skin except for marginal edges thereof which leave the outboard flanges uncovered;
   (d) bonding the outboard flanges of the reinforcement member to the outer skin with an adhesive in the area of the uncovered marginal edges;
   (e) applying metallic paint to the exterior surface of the skin;
   (f) heating the part to dry the paint in a convection oven at a temperature of at least 300° Fahrenheit; and
   (g) using the metallic sheet to evenly distribute heat to avoid paint blemishes at areas of increased mass where the reinforcement member is next to the outer skin thereby providing an aesthetically pleasing surface for the part.

7. The method of claim 6 wherein the sheet is an aluminum foil approximately 1–3 mils thick.

8. The method of claim 7 wherein the part is a cover panel for a vehicle engine, with said metallic sheet further serving as a RFI shield.

9. The method of claim 8 wherein said outer skin and reinforcement member are made of fiber reinforced plastic.

10. A painted plastic exterior automotive body panel made by the method comprising:
   providing a relatively large plastic outer skin with an interior and exterior surface;
   providing a reinforcement member with inboard and outboard flanges;
   applying a thermally conductive metallic foil to the interior surface of the skin;
   bonding the reinforcement member to the outer skin such that the foil is sandwiched between at least the inboard flange and the skin;
   applying paint to the exterior surface of the skin;

heating the paint in a convection oven at a temperature of at least 300° Fahrenheit; and using the foil to evenly distribute the heat to avoid paint blemishes at areas where the reinforcement member is next to the outer skin.

11. The part of claim 10 wherein the paint has metallic particles therein.

* * * * *